United States Patent
Satzger et al.

(10) Patent No.: US 9,963,013 B2
(45) Date of Patent: May 8, 2018

(54) METHOD OF HEATING THE INTERIOR OF A VEHICLE

(71) Applicant: Bayerische Motoren Werke Aktiengesellschaft, Munich (DE)

(72) Inventors: Peter Satzger, Landsberg am Lech (DE); Robert Herbolzheimer, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 673 days.

(21) Appl. No.: 14/339,683

(22) Filed: Jul. 24, 2014

(65) Prior Publication Data

US 2015/0028116 A1 Jan. 29, 2015

(30) Foreign Application Priority Data

Jul. 25, 2013 (DE) .................. 10 2013 214 554

(51) Int. Cl.
| | |
|---|---|
| *B60H 1/03* | (2006.01) |
| *B60H 1/22* | (2006.01) |
| *B60H 1/00* | (2006.01) |

(52) U.S. Cl.
CPC ............ *B60H 1/2218* (2013.01); *B60H 1/03* (2013.01); *B60H 1/004* (2013.01);
(Continued)

(58) Field of Classification Search
CPC .. B60H 1/2218; B60H 1/004; B60H 1/00742; B60H 1/034; B60H 1/03;
(Continued)

(56) References Cited

U.S. PATENT DOCUMENTS 3,619,555 A * 11/1971 Bassett, Jr. .......... B60H 1/2225
219/202
4,685,616 A * 8/1987 Stein ....................... F23N 5/022
236/46 F
(Continued)

FOREIGN PATENT DOCUMENTS

DE 10110142 A1 * 11/2002 ............... B60H 1/22
DE 198 08 571 B4 2/2009
(Continued)

OTHER PUBLICATIONS

German Office Action dated Mar. 12, 2014 with English Translation (ten (10) pages).

(Continued)

*Primary Examiner* — Gregory Huson
*Assistant Examiner* — Daniel E Namay
(74) *Attorney, Agent, or Firm* — Crowell & Moring LLP

(57) ABSTRACT

A method of heating the interior of a vehicle is provided. The vehicle has a central heating system and several decentralized heating surfaces constructed as infrared radiators. The temperature of the vehicle interior is controllable by the central heating system and/or the decentralized heating surfaces corresponding to a heating demand of at least one vehicle occupant. For controlling the temperature of the vehicle interior corresponding to a heating demand, a power distribution takes place between the central heating system and the decentralized heating surfaces as a function of specified distribution demands.

19 Claims, 2 Drawing Sheets

(52) U.S. Cl.
CPC ............... *B60H 1/00742* (2013.01); *B60H 2001/00214* (2013.01); *B60H 2001/00228* (2013.01); *B60H 2001/224* (2013.01); *B60H 2001/2237* (2013.01); *B60H 2001/2265* (2013.01)

(58) Field of Classification Search
CPC ...... B60H 2001/2237; B60H 2001/224; B60H 2001/2265; B60H 2001/00214; B60H 2001/00228
USPC .......................................... 237/5, 2 A, 12.3 R
See application file for complete search history.

(56) References Cited

U.S. PATENT DOCUMENTS

| | | | | |
|---|---|---|---|---|
| 8,362,398 | B2* | 1/2013 | Heiden | B60L 1/02 219/202 |
| 8,859,938 | B2* | 10/2014 | Eisenhour | B60H 1/00742 219/202 |
| 9,156,330 | B2* | 10/2015 | Eisenhour | B60H 1/00742 |
| 9,176,924 | B2* | 11/2015 | Ricci | G06F 9/54 |
| 9,296,275 | B2* | 3/2016 | Huyghe | B60H 1/2225 |
| 2006/0222672 | A1* | 10/2006 | Ezaka | A61L 9/125 424/401 |
| 2010/0130808 | A1* | 5/2010 | Hattori | B60N 2/5685 600/9 |
| 2010/0176110 | A1* | 7/2010 | Ogino | B60H 1/00271 219/202 |
| 2010/0187211 | A1 | 7/2010 | Eisenhour et al. | |
| 2010/0258645 | A1* | 10/2010 | Hioki | B60H 1/2218 237/28 |
| 2011/0042988 | A1* | 2/2011 | Alpert | B60H 1/2218 296/24.3 |
| 2011/0127246 | A1* | 6/2011 | Heiden | B60L 1/02 219/202 |
| 2012/0234932 | A1* | 9/2012 | Okamoto | F24H 3/002 237/2 R |
| 2013/0055751 | A1* | 3/2013 | Inaba | B60H 1/2218 62/498 |
| 2013/0092364 | A1* | 4/2013 | Kumar | B60H 1/00742 165/237 |
| 2013/0119042 | A1* | 5/2013 | Eisenhour | B60H 1/00742 219/202 |
| 2013/0158821 | A1* | 6/2013 | Ricci | G06F 9/54 701/51 |
| 2013/0270249 | A1* | 10/2013 | Suzuki | B60H 1/143 219/202 |
| 2014/0191049 | A1* | 7/2014 | Huyghe | B60H 1/2225 237/45 |
| 2015/0028119 | A1* | 1/2015 | Satzger | B60H 1/2215 237/28 |
| 2016/0318375 | A1* | 11/2016 | Kamiyama | B60H 1/2221 |

FOREIGN PATENT DOCUMENTS

| | | | | |
|---|---|---|---|---|
| DE | 10 2009 007 414 A1 | | 8/2010 | |
| DE | 10 2011 077 993 A1 | | 12/2012 | |
| EP | 2221199 A1 | * | 8/2010 | ........... B60H 1/2218 |
| JP | 60042115 A | * | 3/1985 | ......... B60H 1/00285 |
| JP | 60213519 A | * | 10/1985 | ......... B60H 1/00478 |
| JP | 61024613 A | * | 2/1986 | ........... B60H 1/2218 |
| JP | 2005212556 A | * | 8/2005 | |
| JP | 2006123885 A | * | 5/2006 | ............... B60H 1/22 |
| JP | 2014190674 A | * | 10/2014 | ......... B60H 1/00742 |
| JP | 2014205432 A | * | 10/2014 | ........... B60H 1/2215 |
| JP | 2014208515 A | * | 11/2014 | ........... H05B 1/0236 |

OTHER PUBLICATIONS

English translation of Chinese-language Office Action issued in counterpart Chinese Application No. 201410355437.7 dated Aug. 1, 2017 (Eight (8) pages).

* cited by examiner

METHOD OF HEATING THE INTERIOR OF A VEHICLE

CROSS REFERENCE TO RELATED APPLICATIONS

This application claims priority under 35 U.S.C. § 119 from German Patent Application No. 10 2013 214 554.3, filed Jul. 25, 2013, the entire disclosure of which is herein expressly incorporated by reference.

This application contains subject matter related to U.S. application Ser. No. 14/339,700, entitled "Method of Heating the Interior of a Vehicle" filed on Jul. 24, 2014.

BACKGROUND AND SUMMARY OF THE INVENTION

The invention relates to a method of heating the interior of a vehicle, particularly of a hybrid or electric vehicle, the vehicle having a central heating system and several decentralized heating surfaces constructed as infrared radiators, and the temperature of the vehicle interior being controllable by the central heating system and/or the decentralized heating surfaces corresponding to a heating demand of at least one vehicle occupant.

Currently, the temperature of most vehicles is controlled by use of a conventional heating and cooling system corresponding to the driver's demands. In addition to having this conventional heating system, many vehicles are also equipped with a seat heating system, which can be activated by the driver or by the person situated in the seat. This seat heating system only sets the temperature of the seat corresponding to the adjusted activation stage and is controlled completely independently of the conventional heating/cooling system is set.

From the prior art, in addition to the conventional heating system, electric heating systems are also known for setting the temperature of the vehicle interior. Thus, German Patent Document DE 198 08 571 B4 discloses a heating device in addition to the conventional heating and air-conditioning system, which additional heating device consists of at least one infrared radiator which is installed in the vehicle interior in the manner of a decentralized heating system. The heat output of the infrared radiator can be automatically controlled by a corresponding automatic control device, which controls a heat output of the infrared radiator and the heat output of the conventional heating system.

Furthermore, from German Patent Document DE 10 2011 077 993 A1, a vehicle having a heating and cooling system is known, in which case at least a part of the heating and cooling system is arranged in a decentralized manner in the proximity of the individual seat areas of the vehicle. In this case, the control of the decentralized heating and cooling system takes place as a function of the seat occupation.

It is an object of the invention to provide an improved method of heating the interior of a vehicle by way of a central heating system and a decentralized heating system.

This and other objects are achieved by a method of heating the interior of a vehicle, particularly of a hybrid or electric vehicle, the vehicle having a central heating system and several decentralized heating surfaces constructed as infrared radiators. The temperature of the vehicle interior is controllable by the central heating system and/or the decentralized heating surfaces corresponding to a heating demand of at least one vehicle occupant. For controlling the temperature of the vehicle interior corresponding to the heating demand by way of the central heating system and/or the decentralized heating surfaces, a power distribution takes place between the central heating system and the decentralized heating surfaces as a function of specified distribution demands. The method according to the invention as well as its advantageous further developments can be implemented by way of an algorithm or a corresponding arrangement of assemblies in a control device provided for that purpose.

The invention is based on the fact that the vehicle, in which the method according to the invention is to be used for heating the interior of a vehicle, has several decentralized heating surfaces in addition to a conventional central heating system, the decentralized heating surfaces being designed as infrared heating surfaces.

The infrared heating surfaces may be constructed and further developed such that the actual infrared radiator, which consists, for example, of a foil, which is further developed as a radiation generator and through which current flows, on the backside facing away from the vehicle interior, borders on an insulation layer and, on the front side facing the vehicle interior, borders on a heat-transmitting decorative surface, so that the occupant is protected from direct contact with the infrared radiator. The heating surfaces may be arranged at different points in the vehicle interior, for example, in the door panel, in the floor covering, in the area of the center console, in the knee area, in the area of the A-, B-, or C-pillar, the elbow space, the vehicle ceiling, on the front side of the seats or at the rearward covering of the seats, the tunnel or the lateral surfaces of the armrests.

By use of such infrared heating surfaces, an immediate warming of the occupants without any air movement and without any noise can take place by the direct energy transmission of the infrared radiation.

It is the basic idea of the invention to achieve a controlling of the temperature of the interior that is optimal with respect to the occupants' demands, by means of a suitable power distribution between the conventional central heating system and the decentralized heating surfaces. According to the invention, this can be achieved in that, for controlling the temperature of the vehicle interior corresponding to the heating demand, a power distribution takes place between the central heating system and the decentralized heating surfaces as a function of specified distribution demands.

The distribution demand may be specified by different alternatives. According to a first alternative, the power distribution can take place as a function of a manually and/or automatically adjustable distribution prompt, i.e, either the driver can manually set a defined distribution demand, or, on the basis of an analysis of defined parameters, an automatic distribution prompt can be set.

For the manual adjusting of the power distribution between the heating surfaces and the conventional heating system, a slider control may, for example, be provided by whose actuation the driver can define a certain percentage for the heating power, which is to take place or to be generated by a corresponding actuating of the decentralized heating surfaces. In the extreme positions, the entire heating power may be generated only by the conventional central heating system or only by the decentralized heating surfaces.

In contrast to the power distribution as a function of a manually adjustable distribution demand, as an alternative, the distribution demand can also take place automatically by way of predefined marginal conditions and/or currently existing demands and parameters. In particular, the automatic distribution demand or the power distribution can take place such that the temperature in the vehicle interior can be controlled as efficiently as possible corresponding to the heating demand. For example, in this case, the temperature in the vehicle interior can be controlled as efficiently as possible with respect to the energy consumption, with respect to comfort or with respect to a combination of energy consumption and comfort.

Since, by use of the infrared heating surfaces, the interior can be heated very rapidly, particularly a person situated close to the actuated heating element can be warmed, the method may be further developed such that, for reasons of comfort, an actuating of the infrared heating surfaces should basically be preferred. However, under certain circumstances, this could result in an increased energy requirement, which, in turn, should be avoided for reasons of energy efficiency.

In order to be able to achieve a temperature control that is as efficient as possible by use of a corresponding power distribution to the conventional central heating system and the decentralized heating surfaces, the method may also include a computation of the desired heating power of the infrared heating surfaces corresponding to the temperature control demands. This desired heating power of the decentralized heating surfaces can, in this case, be determined as a function of the thermal condition of the interior and/or of a specified desired temperature or of a set desired value (customer setting), and/or possibly also as a function of the current outside temperature. In this case, the thermal condition of the interior in comparison to the set desired value can be determined as a function of the following parameters:

(a) Current temperature in the vehicle interior, and/or (b) heat output desired by the occupant, which, in turn can be determined by a thermo-physiologically-physically oriented computation.

A corresponding computation method for determining the thermal condition of the interior is disclosed, for example, in German Patent Document DE 10 2009 007 414 A1.

The above-mentioned determined desired heat output quantity can be provided by an optimal distribution to the decentralized heating surfaces. Only the residual requirement of heating power is supplied by way of the conventional heating system; i.e. the heating power of the conventional heating system is reduced to an extent in which the heating power can be provided by the operation of the heating surfaces. As a result, optimal comfort is achieved in the case of a minimal electric energy requirement.

Advantageously, the temperature control in the interior or the power distribution can also be influenced as a function of the number of occupants of the vehicle, particularly such that, when occupied passenger seats are recognized, only the heating surfaces in the area of those occupied occupant seats are activate. The heating surfaces that are arranged in the area of unoccupied occupant seats, are not actuated.

Advantageously, the power distribution can also be influenced as a function of the measured power consumption and/or the power consumption to be expected of the central heating system and/or of the decentralized heating surfaces, particularly as a function of the measured power consumption and/or the power consumption of the decentralized heating surfaces that is to be expected, relative to the possible power output of that onboard power supply system that supplies the energy for actuating the decentralized heating surfaces. When it is, for example, determined that the electric power consumption (for example, measured) or the electric power consumption of the decentralized heating surfaces to be expected exceeds a maximally possible power output of an onboard power supply system (such as the low-voltage system (12 V or 48 V), to which the heating surfaces are connected, the power distribution has to be adapted such that a displacement of the heating power takes place in the direction of the conventional heating system, particularly a complete switching-over to the conventional heating operation. The assumption of an exceeding of the electric power demand of the heating surfaces beyond the maximally possible electric power output of the onboard power supply system supplying the power can take place in the simplest manner, for example, by determining and analyzing the occupied seats in the vehicle. If it is determined that (almost) all seats are occupied, and correspondingly (almost) all decentralized heating surfaces should be actuated (which results in a high electric energy consumption), a switching-over can already take place ahead of time to the purely conventional heating operation by way of the central heating system. As an alternative, the switching-over can also already take place when a lower number of persons (for example, 2 persons in the vehicle) is exceeded.

As an alternative to the influencing of the power distribution as a function of the comparison of the measured or assumed electric power consumption of the heating surfaces to be activated and the electric power output of the relevant onboard power supply system, the power distribution can also be influenced or specified as a function of the measured power consumption or the electric power consumption to be expected of the decentralized heating surfaces in comparison to the measured power consumption or the electric power consumption to be expected of the conventional central heating system. When, for example, the electric power consumption of the infrared heating surfaces (in the case of a corresponding seat occupation) or the sum of the electric power consumption of the infrared heating surfaces and of the conventional heating system (in the correspondingly reduced operation) exceeds the actual power consumption or the power consumption to be expected of the conventional heating system in the case of a conventional heating of the interior (thus, without any actuating of the heating surfaces), a switching-over in the direction of a conventional heating operation by way of the central heating system can also take place; i.e. the interior is heated more conventionally and less, or not at all, by way of heating surfaces.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
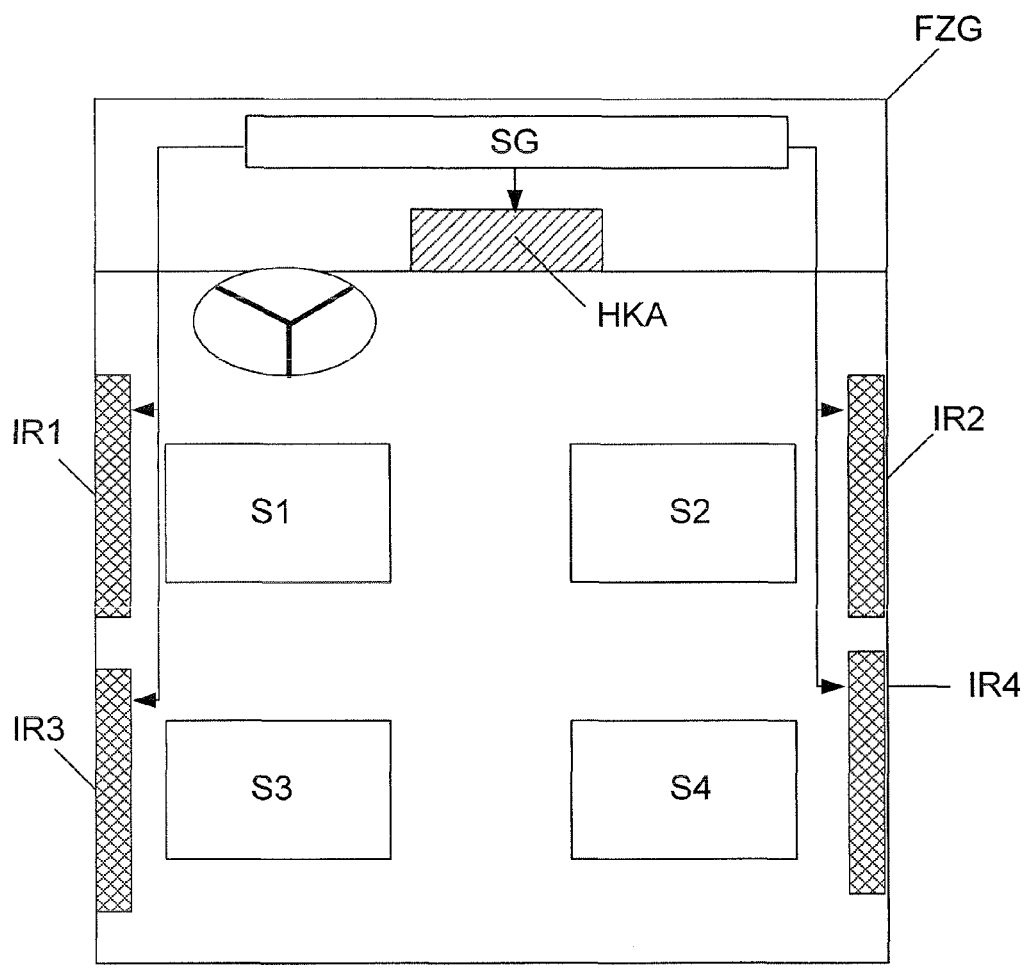
FIG. 1 is a diagrammatic view of the interior of a vehicle having a central heating system and decentralized heating surfaces.

FIG. 1 illustrates a vehicle interior FZG having four seats S1-S4 and a central control unit SG for controlling the temperature of the vehicle interior FZG corresponding to a vehicle occupant's heating demand. The vehicle is equipped with a conventional heating/air conditioning system HKA as the central heating system, which can be actuated by the control device SG for the air conditioning of the vehicle interior corresponding to the heating demands. In addition to the central heating system HKA, four decentralized heating surfaces IR1-IR4 are arranged in a manner distributed in the vehicle. Each of the heating surfaces IR1-IR4 is positioned such that it is used for controlling the temperature of a certain part of the vehicle interior FZG, particularly for controlling the temperature of a certain part of the vehicle interior FZG, and more particularly for controlling the temperature of an area in which an occupant is situated. Each of these heating surfaces IR1-IR4 may, in turn, consist of several heating surface sections, which are installed in the door panel or in the floor covering of the corresponding area. Furthermore, these heating surfaces IR1-IR4 are further developed as so-called infrared radiators and consist of a radiation generator (such as a foil, though which current is flowing), which generates heat from electric energy and radiates it in the form of infrared radiation.

Figure 2:
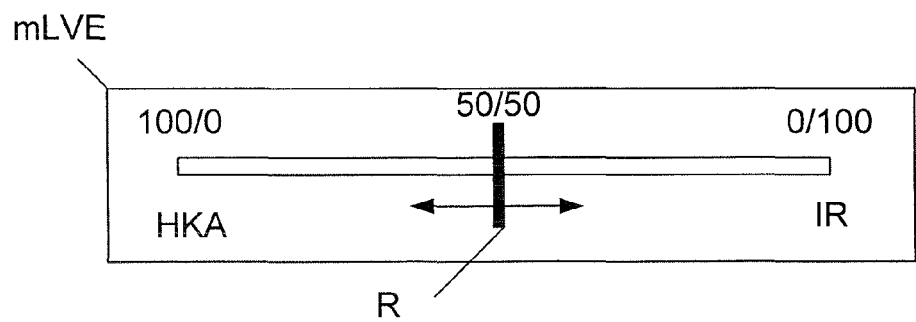
FIG. 2 is a view of a manual power distribution unit constructed as a slider control for the manual setting of a distribution demand of the heating power.

FIG. 2 illustrates a manual power distribution unit mLVE for the manual setting of a distribution demand of the heating power, which may be arranged, for example, in the above-explained vehicle interior. With respect to the details, the unit mLVE comprises a slider control R, which can be positioned over a range of 100/0 to 0/100. When the slider control R is pushed completely to the left, the entire heating demand is provided by the conventional central heating system HKA alone; i.e. the fraction of the heating power of the central heating system amounts to 100%, and the fraction of the heating power of the decentralized heating surfaces amounts to 0%. When the slider control R is completely on the right, the entire heating demand is implemented solely by a corresponding actuation of the decentralized heating surfaces IR; i.e. the fraction of the heating power of the central heating system amounts to 0%, and the fraction of the heating power of the decentralized heating surfaces amounts to 100%. When the slider control R is in the range between the two end positions, the two heating systems, thus the central heating system HKA and the decentralized heating surfaces IR, are actuated corresponding to the distribution demand (which is a result of the position of the slider control R), so that the demanded heating power is provided by a combination of the two systems HKA and IR.

Such a slider control can be physically integrated as an operating element as well as displayed by way of a display in the vehicle or by way of an app on a Smartphone.

Figure 3:
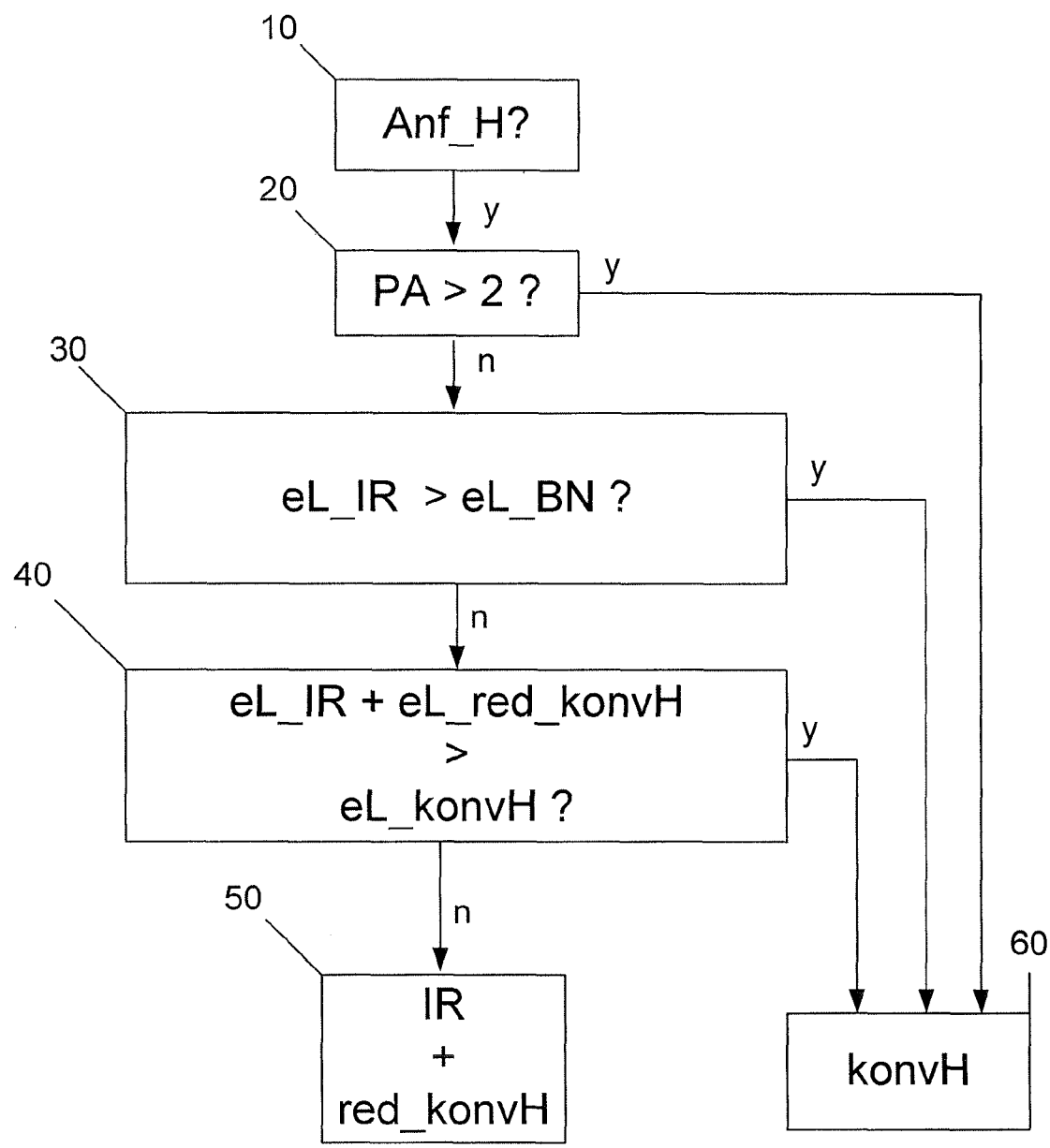
FIG. 3 is an extremely simplified flow chart for illustrating a preferred embodiment of the method according to the invention.

FIG. 3 now illustrates a simplified flow chart for showing a preferred embodiment of the method according to the invention, wherein, in this example, the power distribution is not carried out corresponding to a manually specified distribution demand, but rather by way of an automatically determined distribution demand, which has the purpose of permitting a heating of the vehicle interior that is as efficient as possible.

The process starts in Step 10 as soon as a demand for heating the vehicle interior Anf_H is recognized. If this is the case, it is checked in the next step, by way of a seat occupation detection unit, how many persons PA are present in the vehicle. When it is detected that more than 2 persons PA are present in the vehicle, a jump takes place without further checking to Step 60, and the heating demand Anf_H is implemented by the sole actuating of a conventional central heating system; i.e., a conventional heating konvH of the vehicle interior takes place by way of the central heating system.

However, when not more than two persons PA are present in the vehicle, a change takes place from Step 20 to Step 30. By means of the heating demand and current parameters (for example, the current interior temperature, as required, the ambient temperature), in a first step, a thermo-physically oriented computation takes place of the desired heat output desired by the occupant or the occupants for the (relevant) decentralized heating surfaces. By means of this computed desired heat output, the electric power demand of the infrared heating surfaces eL_IR is determined that is required for this purpose and is compared with the maximally possible electric power output eL_BN of the onboard power supply system used for the actuation of the heating surfaces. If the electric power demand eL_IR of the IR heating surfaces is greater anyhow than the maximally available electric power or power output eL_BN of the onboard power supply system, also without any further checking, a jump takes place directly to Step 60, and the heating demand Anf_H is implemented by the sole actuating of the conventional central heating system; i.e. a conventional heating konvH of the vehicle interior takes place by way of the central heating system.

However, when the electric power demand eL_IR of the IR heating surfaces is not greater than the maximally available electric power or power output eL_BN of the onboard power supply system, a change takes place to Step 40. It is checked there whether the sum of the required electric power for heating the vehicle by actuating the heating surfaces and, if necessary, a correspondingly reduced actuation of the conventional heating system, thus the sum of the electric power demand of the heating surfaces eL_IR and the electric power demand of the conventional heating system in the correspondingly reduced operation eL_red_konvH is greater than the required electric power of the conventional heating system in the case of the sole operation eL_konvH (thus without actuating the heating surfaces).

If this were the case, i.e. the required electric power in the case of a combined operation, would be greater than the required electric power in the case of the sole operation of the central heating system, a jump takes place to Step 60, and the heating demand Anf_H is implemented by the sole actuation of the conventional central heating system; i.e. a conventional heating konvH of the vehicle interior takes place by way of the central heating system.

If, with respect to energy, the actuating of both heating systems is better for heating the vehicle, thus, the sum of the electric power demand of the heating surfaces eL_IR and of the electric power demand of the conventional heating system in the correspondingly reduced operation eL_red_konvH is not greater than the required electric power of the conventional heating system in the case of the sole operation eL_konvH, a jump takes place from Step 40 to Step 50, and the heating demand Anf_H is implemented by a combined actuation of the relevant IR heating surfaces IR and of the conventional heating system in the reduced operation red_konvH.

A variant can be illustrated by a special approach to the actuation of the heating surfaces or of the heating element in the heating air-conditioning system HKA: During the actuation, within a certain time, for example, up to 120 seconds after the start of the heating, and until a certain temperature limit has been reached, the respectively required heating power for the heating surfaces and/or the heating element in the heating air conditioning system can be set independently of the above-mentioned energy assessment. Only then will the assessment take place corresponding to the above-mentioned method.

A further variant can be implemented by a changed approach after the inquiry in Step 30: When the electric power demand eL_IR of the IR heating surfaces is greater than the maximally available electric power or power output eL_BN of the onboard power supply system, the power eL_IR is limited to the power eL_BN, and the power of the electric power demand of the conventional heating system in the correspondingly reduced operation eL_red_konvH is also corrected correspondingly upward.

By way of the method according to the invention presented here and its advantageous further developments, in a simple and cost-effective manner, an optimal comfort and, by way of the infrared heating surfaces, a clearly faster reaching of the thermal comfort can be ensured while the electric energy consumption is low. In addition, the heating of the vehicle by the electric heating surfaces is acoustically less noticeable, and produces no drafts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of heating an interior of a vehicle equipped with a central heating system and several decentralized heating surfaces in the form of infrared radiators, the method comprising the acts of:
   controlling a temperature of the interior of the vehicle by the central heating system and/or the decentralized heating surfaces in response to a heating demand, wherein
      the act of controlling the temperature includes an inversely proportional power distribution that takes place between the central heating system and the decentralized heating surfaces as a function of specified distribution demands.

2. The method according to claim 1, wherein the inversely proportional power distribution takes places as a function of a manually and/or automatically settable distribution demand.

3. The method according to claim 2, wherein the inversely proportional power distribution automatically takes place such that the temperature in the interior of the vehicle is controllable as efficiently as possible corresponding to the heating demand.

4. The method according to claim 3, wherein the controlling of the temperature in the interior of the vehicle as efficiently as possible is performed in order to consume energy, improve comfort, or to both consume energy and improve comfort.

5. The method according to claim 1, wherein the inversely proportional power distribution automatically takes place such that the temperature in the interior of the vehicle is controllable as efficiently as possible corresponding to the heating demand.

6. The method according to claim 1, further comprising the act of:
   determining the power of the decentralized heating surfaces required for controlling the temperature of the interior as a function of a thermal condition of the interior, a specified desired temperature, and/or a current ambient temperate, wherein
      the thermal condition of the interior is determined as a function of the current interior temperature of the vehicle and/or of a determined desired heat output.

7. The method according to claim 6, wherein the inversely proportional power distribution is influenced as a function of a number of occupants in the vehicle.

8. The method according to claim 1, wherein the inversely proportional power distribution is influenced as a function of a number of occupants in the vehicle.

9. The method according to claim 1, wherein the inversely proportional power distribution is influenced as a function of a measured power consumption and/or a power consumption to be expected of the central heating system and/or the decentralized heating surfaces.

10. The method according to claim 9, wherein the inversely proportional power distribution is influenced as a function of the measured power consumption and/or the power consumption to be expected of the decentralized heating surfaces relative to a possible power output of an onboard power supply system that supplies energy for controlling the decentralized heating surfaces.

11. The method according to claim 1, wherein the inversely proportional power distribution is influenced as a function of a sum of the power consumption to be expected of the decentralized heating surfaces to be actuated and the central heating system or in a correspondingly reduced operation compared to the power consumption to be expected of the central heating system when solely operating.

12. The method according to claim 1, wherein the vehicle is a hybrid or electric vehicle.

13. A method of heating an interior of a vehicle equipped with a central heating system and several decentralized heating surfaces in the form of infrared radiators, the method comprising the acts of:
   determining whether a predetermined number of people are inside the vehicle;
   if a number of people inside the vehicle is greater than the predetermined number of people, controlling a temperature of the interior of the vehicle using only the central heating system; and
   if a number of people inside the vehicle is less than the predetermined number of people, determining a power demand of the infrared radiators, prior to deciding which of the central heating system and the several decentralized heating surfaces to use.

14. The method of claim 13, wherein if the number of people inside the vehicle is less than the predetermined number of people, and a power demand of the infrared radiators is greater than a given amount of electric power, using only the central heating system.

15. The method of claim 14, wherein if the number of people inside the vehicle is less than the predetermined number of people, and the power demand of the infrared radiators is lower than the given amount of electric power, calculating a combined power demand of the infrared radiators and the central heating system.

16. The method of claim 15, wherein if the combined power demand of the infrared radiators and the central heating system is greater than a power demand of only the central heating system, using only the central heating system.

17. The method of claim 16, wherein if the combined power demand of the infrared radiators and the central heating system is lower than a power demand of only the central heating system, using both the central heating system and the several decentralized heating surfaces.

18. The method of claim 17, wherein in the using of both the central heating system and the several decentralized heating surfaces an inversely proportional power distribution takes place between the central heating system and the several decentralized heating surfaces.

19. The method of claim 17, wherein the inversely proportional power distribution takes place as a function of specified distribution demands.

* * * * *